(12) United States Patent
Cocks et al.

(10) Patent No.: US 10,033,242 B2
(45) Date of Patent: Jul. 24, 2018

(54) ELECTRICAL MACHINES AND METHODS OF ASSEMBLING THE SAME

(71) Applicant: Regal Beloit America, Inc., Beloit, WI (US)

(72) Inventors: Rachele Barbara Cocks, Columbia City, IN (US); Michael A. Marks, Fort Wayne, IN (US); Mark A. Brattoli, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 603 days.

(21) Appl. No.: 13/757,394

(22) Filed: Feb. 1, 2013

(65) Prior Publication Data

US 2014/0217844 A1 Aug. 7, 2014

(51) Int. Cl.
*H02K 5/18* (2006.01)
*H02K 11/33* (2016.01)

(52) U.S. Cl.
CPC ............... *H02K 5/18* (2013.01); *H02K 11/33* (2016.01); *Y10T 29/49009* (2015.01)

(58) Field of Classification Search
CPC ............ H02K 5/18; H02K 15/14; H02K 5/20; H02K 11/33; H02K 9/18; H02K 2205/00; H02K 2209/00; Y10T 29/49009
USPC ............................. 310/64, 89, 216.114, 400
See application file for complete search history.

(56) References Cited

U.S. PATENT DOCUMENTS

| | | | |
|---|---|---|---|
| 4,342,929 A * | 8/1982 | Horne | H02K 1/185 310/43 |
| 6,657,337 B1 * | 12/2003 | Delevallee | 310/89 |
| 6,735,081 B1 | 5/2004 | Bishop et al. | |
| 7,505,269 B1 | 3/2009 | Cosley et al. | |
| D611,410 S * | 3/2010 | Sturm | D13/112 |
| 7,813,111 B2 | 10/2010 | Anderson et al. | |
| 7,929,294 B2 | 4/2011 | Yeh et al. | |
| 8,059,383 B2 | 11/2011 | Post et al. | |
| 8,081,466 B2 | 12/2011 | Kaufman et al. | |
| 8,148,648 B2 | 4/2012 | Nelson et al. | |
| 8,214,086 B2 | 7/2012 | Thompson et al. | |
| 2002/0158543 A1 * | 10/2002 | Wolters | H02K 1/146 310/216.074 |
| 2003/0067228 A1 * | 4/2003 | Vanjani | 310/64 |
| 2004/0031587 A1 * | 2/2004 | Fong | F28F 3/027 165/80.3 |

(Continued)

FOREIGN PATENT DOCUMENTS

DE  10313273 A1 * 10/2004 ......... F04D 25/0606

OTHER PUBLICATIONS

DE 10313273 Description, English translation.*

*Primary Examiner* — Quyen Leung
*Assistant Examiner* — Noli Manaloto
(74) *Attorney, Agent, or Firm* — Armstrong Teasdale LLP

(57) ABSTRACT

A housing for coupling to a motor having an axis of rotation is provided. The housing includes an end cap having an outer surface and an inner surface. The housing also includes a plurality of first heat fins coupled to the outer surface. Each first heat fin of the plurality of first heat fins includes a first portion extending radially from the axis of rotation. In addition, the housing includes a second portion coupled to first portion and extending parallel to the axis of rotation. The housing further includes a second heat fin coupled to the second portion.

21 Claims, 7 Drawing Sheets

(56) References Cited

U.S. PATENT DOCUMENTS

| | | | | |
|---|---|---|---|---|
| 2004/0051409 A1* | 3/2004 | Nakamura | ............ | H02K 11/046 |
| | | | | 310/68 D |
| 2009/0142203 A1* | 6/2009 | De Filippis | ............ | F04D 25/082 |
| | | | | 417/353 |
| 2010/0277032 A1* | 11/2010 | De Filippis | ............ | H02K 5/148 |
| | | | | 310/227 |
| 2012/0096902 A1* | 4/2012 | Major | ................ | D06F 37/206 |
| | | | | 68/140 |
| 2012/0112578 A1* | 5/2012 | Telakowski et al. | ............ | 310/64 |

* cited by examiner

ELECTRICAL MACHINES AND METHODS OF ASSEMBLING THE SAME

BACKGROUND OF THE INVENTION

The embodiments described herein relate generally to electrical machines and associated electronics, and more particularly, to methods and systems for dissipating heat from the electrical machines.

Certain electrical machines are sometimes referred to as brushless motors. Brushless motors include both brushless AC motors and brushless DC motors and are used in a wide variety of systems operating in a wide variety of industries. Motors commonly include a stator having a plurality of stacked laminations and a central bore for receiving a rotor and associated bearings. A housing encloses the motor and electronics that control the motor. The housing includes a pair of end frames or end caps can be coupled to opposite ends of the stator to facilitate supporting the rotor. Proper radial and axial alignment between the motor components is desired to facilitate providing free rotation of the rotor, preventing excessive eccentricity in an annular air gap between the rotor and the stator and preventing excessive axial rotor thrust.

If not properly dissipated, heat generated by electronics and/or other components during operation of the electrical machine can shorten the life span of various electronics and/or motor components and/or generally result in poor performance of the electrical machine. Cooling fans can be used to facilitate removing heat from the electrical machine into the surrounding environment. Cooling fans, however, should continuously operate in order to create the forced air circulation over the electrical machine. Accordingly, reliability of the electrical machine may become dependent on keeping the cooling fan running so that machine does not overheat and fail, wherein the reliability of the system could be limited to the mean-time-between-failure (MTBF) ratings of the fans.

In other applications, thermal energy generated from the electrical machine can be directed to a heat fin that is either mounted to or an integral part of the electrical machine. Typically, heat fins coupled to the end caps include a plurality of fins exposed to the ambient atmosphere. The fins establish a large surface area that is in contact with the external ambient environment, promoting thermal heat transfer from the heat fin to the environment. Conventional heat fins, however, may not provide enough heat dissipation for some electrical machines and/or electronics enclosures or electronic components which could result in poor performance and/or failure of the electrical machine.

BRIEF DESCRIPTION OF THE INVENTION

In one aspect, a housing for enclosing electronics of a motor having an axis of rotation is provided. The housing includes an end cap having an outer surface and an inner surface. The housing also includes a plurality of first heat fins coupled to the outer surface. Each first heat fin of the plurality of first heat fins includes a first portion extending radially from the axis of rotation. In addition, the housing includes a second portion coupled to first portion and extending parallel to the axis of rotation. The housing further includes a second heat fin coupled to the second portion.

In another aspect, an electrical machine having an axis of rotation is provided. The electrical machine includes a motor having a stator, a rotor coupled to the stator and a motor shaft coupled to the rotor. The electrical machine includes a housing coupled to and enclosing the motor and includes an end cap having an outer surface and an inner surface. In addition, the electrical machine includes a plurality of first heat fins coupled to the outer surface. Each first heat fin of the plurality of first heat fins includes a first portion extending radially from the axis of rotation and a second portion extending parallel to the axis of rotation. The electrical machine further includes a second heat fin coupled to the second portion.

In yet another aspect, a method of assembling an electrical machine is provided. The method includes coupling a plurality of first heat fins to an outer surface of an end cap of the electrical machine. Each first heat fin of the plurality of first heat fins includes a first portion having a first shape and a second portion coupled to the first portion having a second shape that is different than the first shape. The method includes coupling a second heat fin to the second portion.

In another aspect, a housing for enclosing electronics of a motor having an axis of rotation is provided. The housing includes an end cap comprising an outer surface and an inner surface. The housing further includes a plurality of first heat fins coupled to the outer surface, each first heat fin of the plurality of first heat fins having: a first portion extending radially from the axis of rotation; and a second portion coupled to the first portion and extending parallel to the axis of rotation, at least one of the first portion and the second portion having a shape comprising at least one of a corrugated shape, a sinusoidal shape and a curved shape.

DETAILED DESCRIPTION OF THE INVENTION

The embodiments described herein relate to electrical machines and methods of assembling the electrical machines. More particularly, the embodiments relate to a heat transfer assembly that is configured to facilitate heat dissipation from the electrical machine and/or electrical components housed within the electrical machine. More particularly, the embodiments relate to an end cap and heat fins coupled to the end cap. It should be understood that the embodiments described herein for electrical machines are not limited to motors, and further understood that the descriptions and figures that utilize a motor, a housing and heat fins are exemplary only. Moreover, while the embodiments illustrate a three phase electric motor, the embodiments described herein may be included within motors having any number of phases, including single phase and multiple phase electric motors. Moreover, housing is not limited to electrical machines and/or motors, but may enclose electrical components that are separated from a motor and/or any heat generating component.

Figure 1:
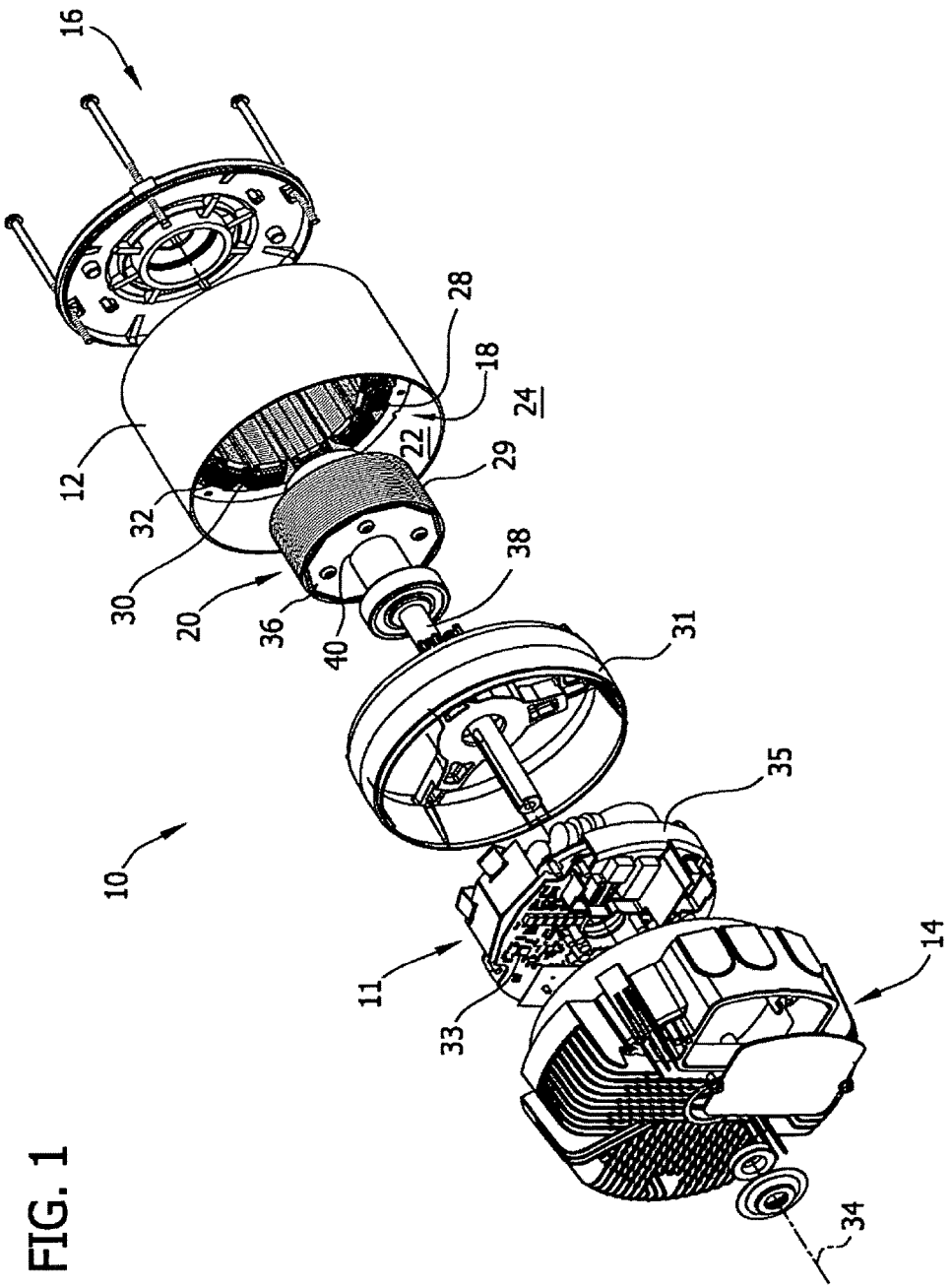
FIG. 1 is an exploded cutaway view of an exemplary electric motor and an exemplary control system coupled to motor for use in controlling operation of the motor.

FIG. 1 is an exploded cutaway view of an exemplary electrical machine 10 that can be operated as either a generator or a motor and a control system 11 coupled to motor 10 for use in controlling operation of motor 10. Electric motor 10 includes housing 12 having a first end cap 14 and a second end cap 16. Electric motor 10 further includes a stationary assembly 18 and a rotatable assembly 20. Motor assembly housing 12 defines an interior 22 and an exterior 24 of motor 10 and is configured to at least partially enclose and protect stationary assembly 18 and rotatable assembly 20. Stationary assembly 18 includes a stator core 28, which includes a plurality of stator teeth 30 and a plurality of winding stages 32 wound around stator teeth 30 and adapted to be electronically energized to generate an electromagnetic field. In the exemplary embodiment, a variable frequency drive (not shown) provides a signal, for example, a pulse width modulated (PWM) signal, to electric motor 10. In an alternative embodiment, electric motor 10 includes a controller 11 coupled to winding stages 32 and configured to apply a voltage to one or more of winding stages 32 at a time for commutating winding stages 32 in a preselected sequence to rotate rotatable assembly 20 about an axis of rotation 34.

In an exemplary embodiment, stationary assembly 18 is a three phase concentrated wound stator assembly and stator core 28 is formed from a stack of laminations (not shown) made of a magnetically permeable material. While stationary assembly 18 is illustrated for purposes of disclosure, it is contemplated that other stationary assemblies of various other constructions having different shapes, configurations, phases and with different numbers of teeth may be utilized.

Rotatable assembly 20 includes a rotor 36 such as, for example, permanent magnet rotor core or an induction rotor and a shaft 38. Rotatable assembly 20 may also be referred to as an interior permanent magnet rotor. Examples of motors 10 that may include interior permanent magnet rotors include, but are not limited to, electronically commutated motors (ECMs). ECMs may include, but are not limited to, brushless direct current (BLDC) motors, brushless alternating current (BLAC) motors, and synchronous reluctance motors.

In the exemplary embodiment, rotor core 36 is formed from a stack of laminations 29 made of a magnetically permeable material and is substantially received in a central bore of stator core 28. Rotor core 36 includes a shaft opening 40 having a diameter corresponding to a diameter of shaft 38. Rotor core 36 and shaft 38 are concentric and configured to rotate about axis of rotation 34. Rotor core 36 and stator core 28 are illustrated as being solid in FIG. 1 for simplicity, their construction being well known to those of ordinary skill in the art. For example, cores 36 and 38 may be formed using a sintering process from a soft magnetic composite (SMC) material, a soft magnetic alloy (SMA) material, and/or a powdered ferrite material.

Winding stages 32 are commutated without brushes by sensing the rotational position of rotatable assembly 20 as it rotates within stator core 28 and utilizing electrical signals generated as a function of the rotational position of rotatable assembly 20 sequentially to apply a voltage to each of winding stages 32 in different preselected orders or sequences that determine the direction of the rotation of rotatable assembly 20. Motor 10 includes an enclosure 31 which is coupled to end cap 14. Control system 11 is coupled to end cap 14 and includes a plurality of electronic components 33 mounted on a component board 35, such as a printed circuit board. Control system 11 is connected to winding stages 32 and applies a voltage to one or more winding state 32 at a time for commutating winding stage 32 in a preselected sequence to rotate rotatable assembly 20 about axis of rotation 34. Position sensing may be accomplished by a position-detecting circuit (not shown) responsive to the back electromotive force (EMF) to provide a simulated signal indicative of the rotational position of rotatable assembly 20 to control the timed sequential application of voltage to winding stages 32 of stationary assembly 18. Other means of position sensing may also be used. In the exemplary embodiment, motor 10 includes a brushless AC motor. Alternatively, motor 10 may include other motors such as, but not limited to, brushless DC motors and switched reluctance motors. Motor 10 includes a voltage rating which is determined by the motor manufacturer and which is stored in control system 11. Motor 10 further includes a pre-determined operating threshold, which is also stored in control system 11, for efficient operation of motor 10.

Figure 2:
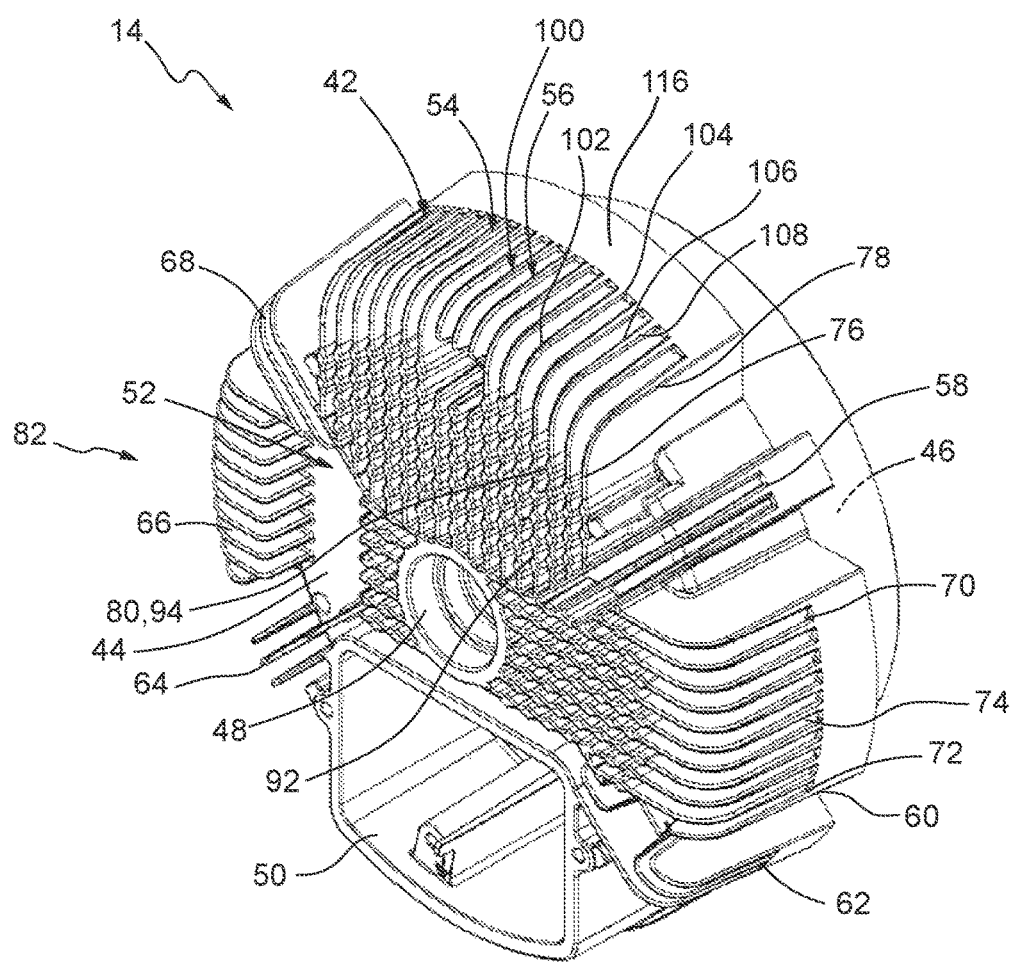
FIG. 2 is a perspective view of an exemplary end cap of the electric motor shown in FIG. 1 and an exemplary heat transfer assembly coupled to the end cap.
Figure 3:
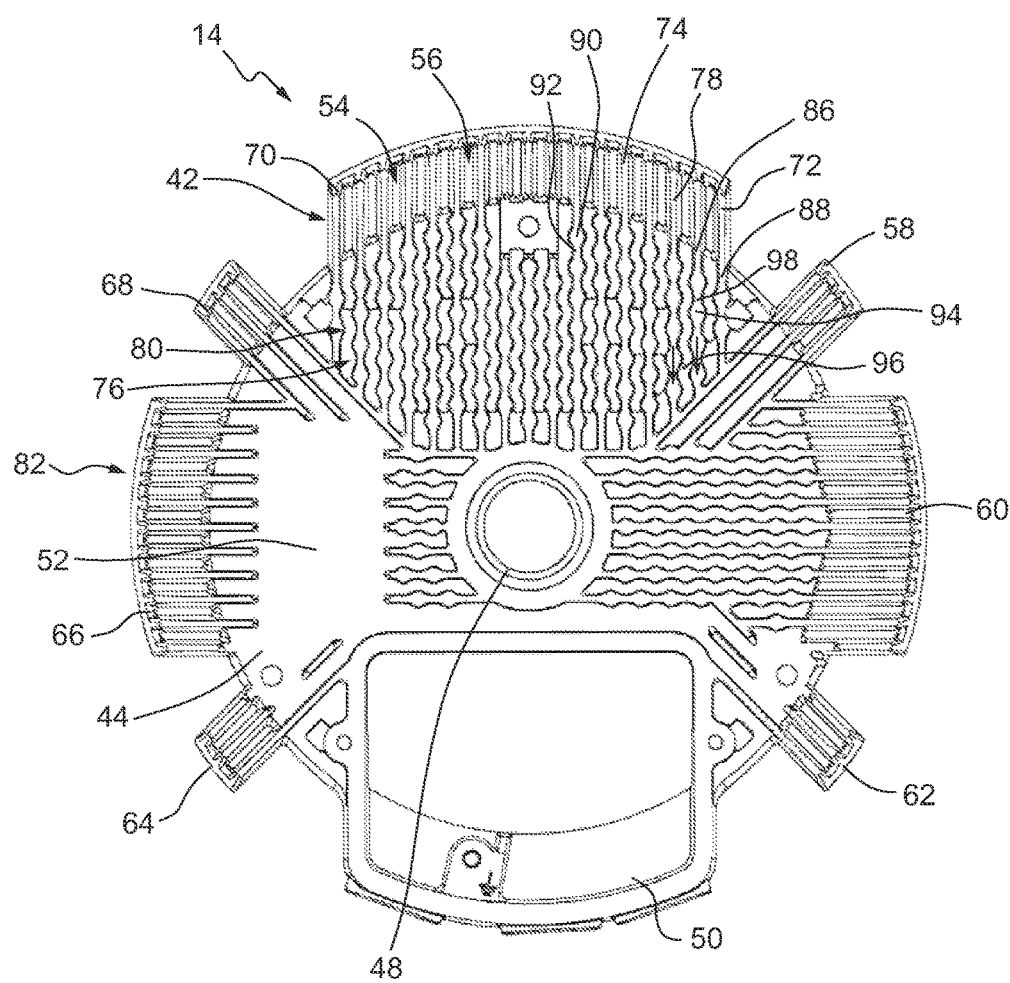
FIG. 3 is a front elevational view of the end cap and the heat transfer assembly shown in FIG. 2.

FIG. 2 is a perspective view of end cap 14 and an exemplary heat transfer assembly 42 coupled to end cap 14. FIG. 3 is a front elevational view of end cap 14 and heat transfer assembly 42. End cap 14 includes an outer surface 44, an inner surface 46 and a shaft bore 48 defined through outer surface 44 and inner surface 46, wherein shaft bore 48 is orientated about axis of rotation 34. End cap 14 further includes a conduit box 50 for allowing access to and housing electrical components 33. End cap 14 further includes a label area 52 for presenting a label (not shown).

Heat transfer assembly 42 includes a plurality of first heat fins 54, which are coupled to outer surface 44. More particularly, heat transfer assembly 42 includes a first set 56 of first heat fins 54, a second set 58 of first heat fins 54, a third set 60 of first heat fins 54, a fourth set 62 of first heat fins 54, a fifth set 64 of first heat fins 54, a sixth set 66 of first heat fins 54 and a seventh set 68 of first heat fins 54. Each set 56, 58, 60, 62, 64, 66, and 68 includes an initial heat fin 70, a final heat fin 72 and intermediate heat fins 74 between initial heat fin 70 and final heat fin 72. Sets 56, 58, 60, 62, 64, 66 and 68 can include any number of first heat fins 54 to enable end cap 14 to function as described herein. First set 56, third set 60 and sixth set 66 of first heat fins 54 are coupled to outer surface 44 and are substantially perpendicular to axis of rotation 34. Second 58, fourth 62, fifth 64 and seventh sets 68 are coupled to outer surface 44 at about 45° with respect to axis of rotation 34. Sets 56, 58, 60, 62, 64, 66 and 68 can be orientated in any position with respect to axis of rotation 34 to enable end cap 14 to function as described herein. Alternatively, heat transfer assembly 42 may be coupled to housing 12 and extending outward therefrom.

Each first heat fin 54 includes a first portion 76 that extends radially outward from shaft bore 48 surrounding axis of rotation 34 and toward outer diameter of cap 14. Moreover, each first heat fin 54 includes a second portion 78 that is coupled to first portion 76 and extends parallel to axis of rotation 34 and beyond outer diameter of the cap 14. More particularly, second portion 78 is coupled to first portion 76 at about a 90° angle. Alternatively, second portion 78 can couple to first portion 76 at any angle to enable end cap 14 to function as described herein. First portion 76 includes a first shape 80 that is configured to facilitate heat transfer from end cap 14 and into ambient air 82. In the exemplary embodiment, first shape 80 includes a shape such as, but not limited to, a corrugated shape, a sinusoidal shape, an angular shape and a curved shape. Alternatively, first shape 80 may include other shapes such as a substantially straight shape. First shape 80 is sized and shaped to increase surface area to facilitate heat transfer from end cap 14 and into ambient air 82 through at least one of convection and radiation.

Each first portion 76 includes a first side 86 and a second side 88. Each first side 86 and second side 88 includes an inner end 90 coupled to end cap outer surface 44 and an outer end 92 exposed to ambient air 82. First side 86 and second side 88 repeatedly couple to each other and repeatedly separate from each other to form a plurality of first channels 94 along first portion 76. Each first channel 94 extends from inner end 90 to outer end 92 and is in flow communication with outer surface 44. Due to heat generated by at least electrical component 33 (shown in FIG. 1), outer surface 44 has a higher temperature than ambient air 82. First side 86 and second side 88 are configured to transfer heat from end cap outer surface 44 through conduction and transfer heat from each first fin 54 and into ambient air 82 present in first channels 94 through at least one of convection and radiation. First channels 94 are shaped to receive heat from first side 86 and second side 88 and transfer the heat into ambient air 82. Since ambient air 82 has a lower temperature than first side 86 and second side 88, ambient air 82 has a greater propensity to absorb heat. Heat mixes with ambient air 82 that is present in first channel 94 to form mixed heated air 96. Due to heat transfer, mixed heated air 96 expands and seeks to flow to a low pressure area, such as ambient air 82, via natural convection. The heat transfer is facilitated as a pressure differential creates a flow of air 96 at a higher velocity which enhances heat exchange from first fin 54 into ambient air 82 by creating localized forced convection. Moreover, first channels 94 are shaped to create localized forced convection due to pressure changes created when ambient air 82 is heated causing airflow 96 to expand and move upward from outer surface 44, beyond channels 94 and into ambient air 82. Mixed heated air 96 flows within first channel 94, and over and adjacent first side 86 and second side 88 to further draw heat from first side 86 and second side 88. Mixed heated air 96 flows out of first channel 94 and into ambient air 82 to enhance heat transfer from end cap 14.

In the exemplary embodiment, pairs of adjacent first heat fins 54 form a second channel 98 there between. More particularly, first side 86 of first heat fin 54 and second side 88 of adjacent first heat fin 54 are separated to facilitate forming second channel 98. Since first heat fin 54 includes first shape 80, second channel 98 is configured to substantially match first shape 80 such as, but not limited to, corrugated shape, sinusoidal shape, angled shape and curved shape. Alternatively, second channel 98 can include other shapes such as, for example, a substantially straight shape. Second channel 98 can include any shape to enable end cap 14 to function as described herein.

First side 86 and second side 88 are configured to transfer heat from end cap outer surface 44 through conduction and transfer heat into second channels 98 through at least one of convection and radiation. Second channels 98 are shaped to receive heat from first side 86 and second side 88 and transfer heat to ambient air 82 present in second channels 98. Since ambient air 82 has a lower temperature than first side 86 and second side 88, ambient air 82 has a greater propensity to absorb heat. Heat mixes with ambient air 82 that is present in second channel 98 to form mixed heated air 96. Due to heat transfer, mixed heated air 96 expands and seeks to flow to a lower pressure area, such as ambient air 82, via natural convection. The heat transfer is facilitated as a pressure differential creates a flow of air 96 at a higher velocity which enhances heat exchange from first fin 54 into ambient air 82 by creating localized forced convection. Moreover, second channels 98 are shaped to create localized forced convection due to pressure changes created when ambient air 82 is heated causing airflow 96 to expand and move upward from outer surface 44, beyond channels 98 and into ambient air 82. Mixed heated air 96 flows within second channel 98, and flows over and adjacent first side 86 and second side 88 to further draw heat from first side 86 and second side 88. Mixed heated air 96 flows out of second channel 98 and into ambient air 82 to facilitate heat transfer from end cap 14.

In the exemplary embodiment, second portion 78 includes a second shape 100 that is different than first shape 80. Alternatively, second shape 100 may be substantially similar to first shape 80. Second portion 78 includes a first end 102 and a second end 104, wherein first end 102 includes a smaller width than a width of second end 104. In the exemplary embodiment, first end 102 includes a curved shape and second end 104 includes a substantially straight shape. First end 102 and second end 104 can include any shape, to enable end cap 14 to function as described herein. Second portion 78 further includes a first sidewall 106 and a second sidewall 108 which are coupled to and extend between first end 102 and second end 104. Since first end 102 includes a smaller width than second end 104, first sidewall 106 diverges from second sidewall 108 from first end 102 toward second end 104. Second portion 78 is sized and shaped to increase surface area to facilitate transferring heat from end cap 14 and into ambient air 82 by at least one of convection and radiation.

Figure 4:
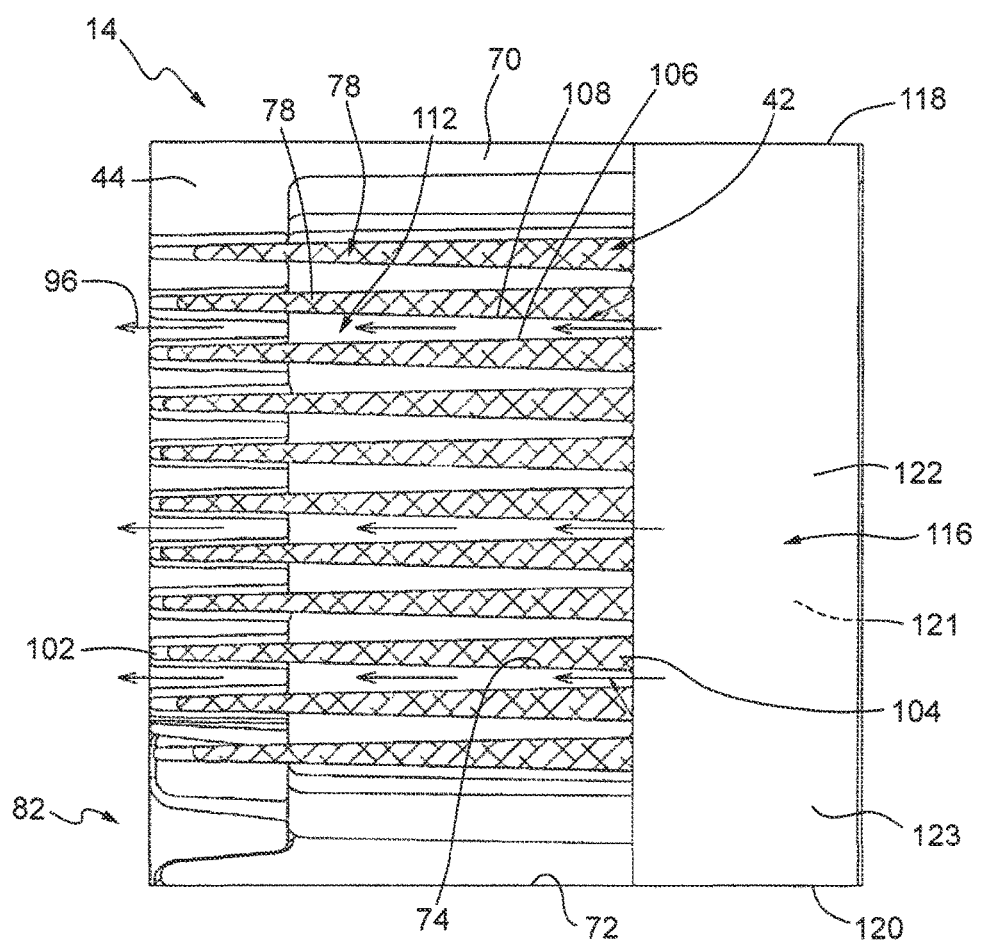
FIG. 4 is a partial, top view of the end cap and the heat transfer assembly shown in FIG. 2.

FIG. 4 is a partial, top view of end cap 14 and heat transfer assembly 42. In the exemplary embodiment, pairs of adjacent second portions 78 define a third channel 112 there between. More particularly, first side wall 106 of second portion 78 and second side wall 108 of adjacent second portion 78 are separated to facilitate forming third channel 112. Since first sidewall 106 and second sidewall 108 diverge from each other from first end 102 to second end 104, third channel 112 converges from first end 102 to second end 104. Alternatively, third channel 112 can include any configuration to enable end cap 14 to function as described herein.

Third channel 112 receives ambient air 82 which has a greater propensity to absorb heat. First side wall 106 and second side wall 108 are shaped to transfer heat from end cap outer surface 44 through conduction and transfer heat into third channels 112 through at least one of convection and radiation. Third channels 112 are shaped to receive heat from first side wall 106 and second side wall 108 and to transfer heat into ambient air 82 that is present within third channel 112. Since ambient air 82 has a lower temperature than first side wall 106 and second side wall 108, ambient air 82 has a greater propensity to absorb heat. Heat mixes with ambient air 82 that is present in third channel 112 to form mixed heated air 96. Due to heat transfer, mixed heated air 96 expands and seeks to flow to a lower pressure area, such as ambient air 82, via natural convection. The heat transfer is facilitated as a pressure differential creates a flow of air 96 at a higher velocity which enhances heat exchange from first fin 54 into ambient air 82 by creating localized forced convection. Moreover, third channels 112 are shaped to create localized forced convection due to pressure changes created when ambient air 82 is heated causing airflow 96 to expand and move upward from outer surface 44, beyond channels 112 and into ambient air 82. Mixed heated air 96 flows within third channel 112, and flows over and adjacent first side wall 106 and second side wall 108 to further draw heat from first side wall 106 and second side wall 108. Mixed heated air 96 flows out of third channel 112 and into ambient air 82 to enhance heat transfer from end cap 14.

Third channel 112 is shaped to direct mixed heated air 96 from second end 104, toward first end 102 and to ambient air 82.

Heat transfer assembly 42 further includes a plurality of second heat fins 116 coupled to first set 56, second set 58, third set 60, fourth set 62, fifth set 64, sixth set 66 and seventh set 68 of the plurality of first heat fins 54 (shown in FIGS. 1 and 2). Second heat fin 116 includes a heat shield and/or a heat wrap. Second heat fin 116 can include any configuration to enable end cap 14 to function as described herein. More particularly, second heat fin 116 includes a first side 118 and a second side 120. Second heat fin 116 further includes a third side 122 which is coupled to and extends between first side 118 and second side 120. First side 118 is coupled to initial first heat fin 70 and second side 120 is coupled to final first heat fin 72 of respective first set 56, second set 58, third set 60, fourth set 62, fifth set 64, sixth set 66 and seventh set 68 of the plurality of first heat fins 54.

Third side 122 is coupled to initial first heat fin 70, final first heat fin 72 and intermediate first heat fins 74 of respective sets 56, 58, 60, 62, 64, 66 and 68 of the plurality of first heat fins 54. More particularly, third side 122 is coupled to each second end 104. Third side 122 includes an inner surface 121 coupled to second end 104 and an outer surface 123 exposed to ambient air 82. In the exemplary embodiment, third side 122 is configured to at least partially cover each second end 104. Alternatively, third side 122 can couple to second portion 78 to fully cover second portion 78 and channels 112. Moreover, in an alternative embodiment, at least one of first side 118, second side 120 and third side 122 can include apertures, slots, and/or grooves (not shown). Second heat fin 116 is configured to increase surface area to facilitate heat transfer from second portion 78 and into ambient air 82 through at least one of convection and radiation.

Figure 5:
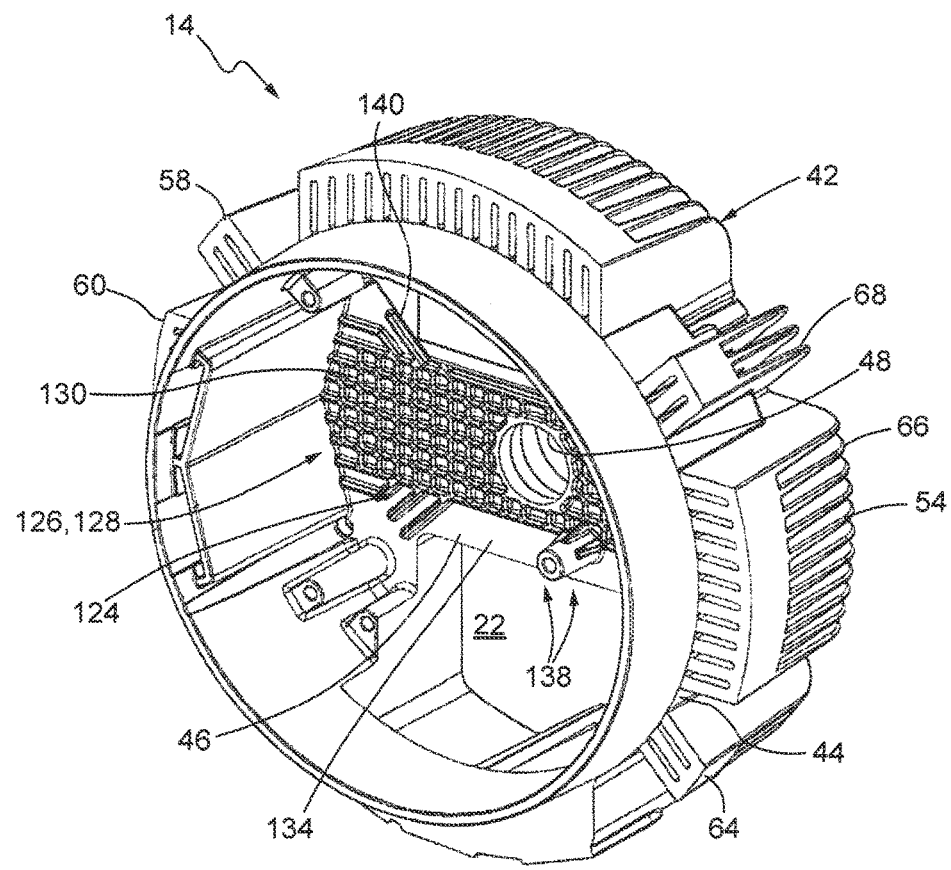
FIG. 5 is a rear perspective view of the end cap and the heat transfer assembly shown in FIG. 2.
Figure 6:
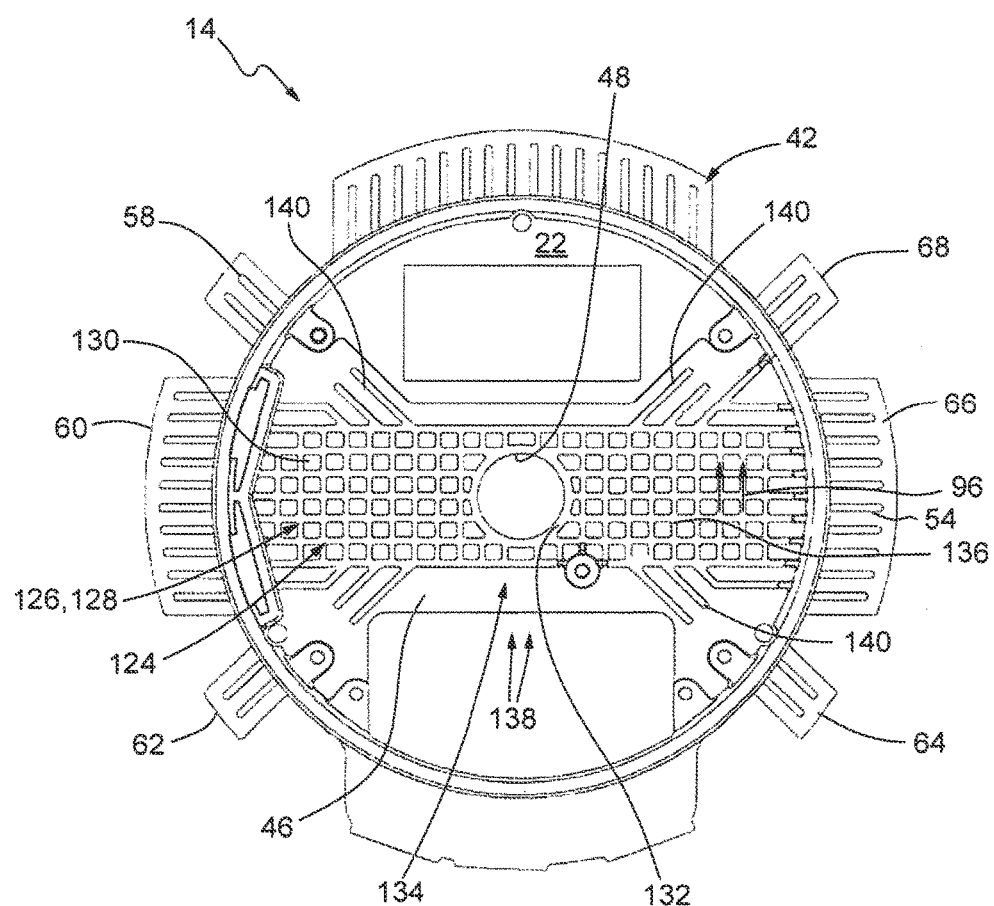
FIG. 6 is a rear elevational view of the end cap and the heat transfer assembly.

FIG. 5 is a rear perspective view of end cap 14 and heat transfer assembly 42. FIG. 6 is a rear elevational view of end cap 14 and heat transfer assembly 42. Heat transfer assembly 42 includes a third heat fin 124 coupled to inner surface 46. Third heat fin 124 includes a third shape 126 that is different from at least one of first shape 80 and second shape 100. Alternatively, third shape 126 may include substantially the same shape of at least one of first shape 80 and second shape 100. Third heat fin 124 is sized and shaped to facilitate heat transfer from interior 22 and/or from electrical component 33 (shown in FIG. 1), through inner surface 46 and to outer surface 44.

In the exemplary embodiment, third heat fin 124 includes a uniform shape 128 of a plurality of first projections 130 that extend from inner surface 46 and into interior 22. Moreover, projections 130 are coupled to a central portion 134 of inner surface 46. In the exemplary embodiment, central portion 134 is coupled to inner surface 46 and opposite of outer surface 44 that is positioned between third set 60 and sixth set 66 of first heat fins 54. Each projection 130 includes a substantially square shape which is configured to maximize surface area exposed to interior 22 and minimize space requirements within interior 22. Alternatively, each projection 130 may include other shapes such as circular shapes. Moreover, each projection 130 may include a plurality of textured surfaces and/or non-smooth surfaces to increase surface area exposed to interior 22 to facilitate heat transfer. Textured surfaces may be substantially the same shape. Alternatively, textured surfaces may include a plurality of varied shapes. Projections 130 may include any shape to enable end cap 14 to function as described herein. At least one projection 132, of the plurality of projections 130, which borders shaft bore 48 includes a non-square shape to compensate for a diameter of shaft bore 48. Projections 130, 132 are sized, shaped and positioned to facilitate transferring heat from interior 22 and/or electrical component 33 (shown in FIG. 1), conducts through inner surface 46 and to outer surface 44.

Projections 130 are spaced apart to form a plurality of fourth channels 136. Interior heated air 138 flows within fourth channel 112 and flows adjacent to projections 130. Fourth channels 136 are configured to direct heated interior air 138 in flow contact with projections 130. In the exemplary embodiment, third heat fin 124 further includes a plurality of second projections 140 that are coupled to and extend from inner surface 46 and into interior 22. Second portions 140 are coupled to inner surface 46 and opposite of outer surface 44 of second set 58, fourth set 62, fifth set 64 and seventh set 68 of first heat fins 54. In the exemplary embodiment, second projections 140 have a different shape than first projections 130. More particularly, second projections 140 include an elongated rectangular shape which is configured to maximize surface area exposed to interior 22 and minimize space requirements within interior 22. Alternatively, second projections 140 may include a substantially similar shape to first projections 130. Moreover, each second projection 140 may include a plurality of textured surfaces or non-smooth surface to increase surface area exposed to interior 22 to facilitate heat transfer. Textured surfaces may be substantially the same shape. Alternatively, textured surfaces may include a plurality of varied shapes. Second portions 140 are sized, shaped and positioned to facilitate heat transfer from interior 22 and/or electrical component 33 (shown in FIG. 1), through inner surface 46 and to outer surface 44.

Figure 7:
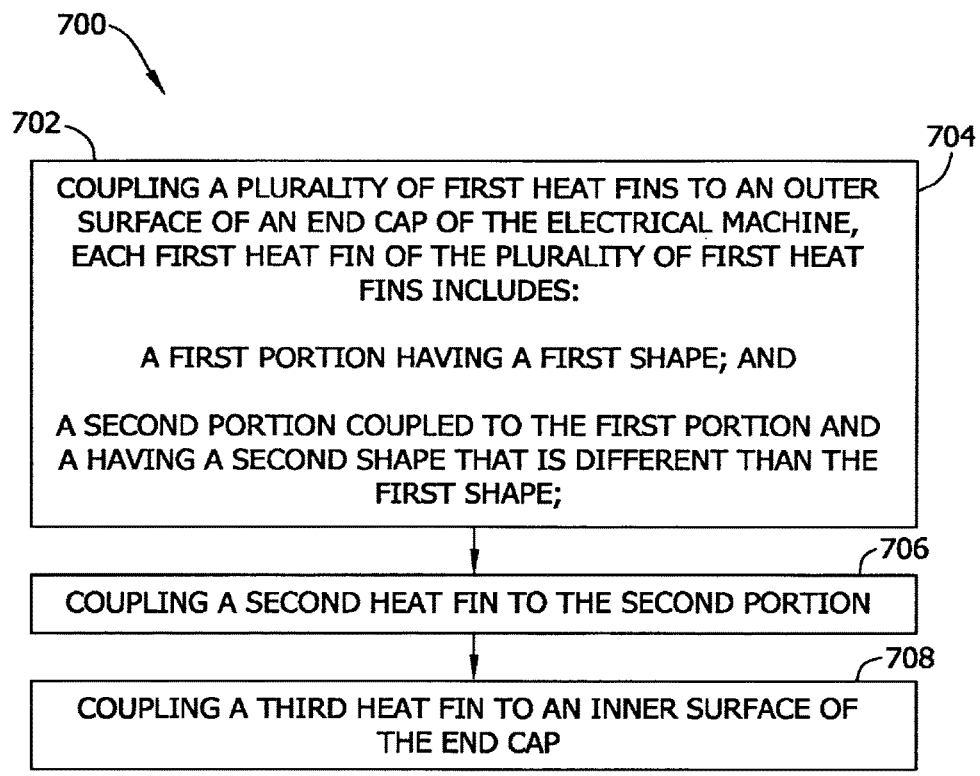
FIG. 7 illustrates an exemplary flowchart illustrating a method of assembling an electrical machine.

FIG. 7 illustrates an exemplary flowchart 700 illustrating a method 702 of assembling an electrical machine, for example motor 10 (shown in FIG. 2). The motor includes a stator, a rotor coupled to the stator and a motor shaft coupled to the rotor along an axis of rotation, for example axis of rotation 34 (shown in FIG. 2). The motor also includes a control system, such as control system 11 (shown in FIG. 1). The motor further includes a housing coupled to and enclosing the motor and includes an end cap, for example end cap 14 (shown in FIG. 2). End cap 14 includes an outer surface and an inner surface, such as outer surface 44 and inner surface 46 (shown in FIG. 2).

Method 702 includes coupling 704 a plurality of first heat fins, for example first fins 54 (shown in FIG. 2), to the outer surface of the end cap. Each first heat fin of the plurality of first heat fins includes a first portion, for example first portion 76 (shown in FIG. 2), having a first shape, for example first shape 80 (shown in FIG. 2). The first portion extends radially from the axis of rotation. Each first fin includes a second portion, for example second portion 78 (shown in FIG. 2), coupled to the first portion. The second portion extends parallel to the axis of rotation. The second portion includes a second shape, for example second shape 100 (shown in FIG. 2), that is different than the first shape.

Method 702 includes coupling 706 a second heat fin, for example second heat fin 116 (shown in FIG. 4), to the second portion. In addition, method 702 includes coupling 708 a third heat fin, for example third heat fin 124 (shown in FIG. 5), to the inner surface of the end cap. In one embodiment, method 702 includes coupling the first portion having at least one of a corrugated shape, a sinusoidal shape, an angled shape and a curved shape. Moreover, method 702 includes coupling the second portion having a divergent shape.

A technical effect of the systems and methods described herein includes at least one of: a plurality of first heat fins coupled to an outer surface, each first heat fin of the plurality of first heat fins includes: a first portion that is extending radially from the axis of rotation and having a first shape; and a second portion coupled to the first portion and extending parallel to the axis of rotation and a having a second shape that is different than the first shape; a second heat fin coupled to the second portion and a third heat fin coupled to an inner surface.

The exemplary embodiments described herein facilitate transferring heat from an electrical machine and/or electrical components housed therein. More particularly, the exemplary embodiments are configured to maximize heat transfer and minimize space requirements for the electrical machine. Moreover, the exemplary embodiments dissipate heat from electrical machines located in a challenging environment such as a confined space and/or minimal or no forced air cooling for the electrical machine. Still further, the exemplary embodiments increase efficiency and reduce operating and maintenance costs associated with the electrical machine.

Exemplary embodiments of an electrical machine and methods for assembling the electrical machine are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications. Moreover, the electrical machine can include a forced air device, such as a fan, coupled to housing and/or shaft.

While the embodiments described herein are described with respect to motors in which a stator surrounds a rotor such as, for example, a permanent magnet rotor or an induction rotor, embodiments are contemplated in which an "inside-out" motor incorporates one or more of the improvements described herein. Inside-out motors refer to motors where a stationary stator is surrounded by a rotating rotor. Further, the embodiments are applicable to any permanent magnet rotating machine.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A housing for enclosing electronics of a motor having an axis of rotation, said housing comprising:
an end cap having a diameter and comprising:
a shaft bore wall defining a shaft bore surrounding the axis of rotation;
an outer surface and an inner surface;
a plurality of first heat fins coupled to said outer surface, said plurality of first heat fins oriented perpendicular to the axis of rotation in a radial direction, each first heat fin of said plurality of first heat fins comprising:
a first portion comprising a radially inner end and a radially outer end, wherein said first portion extends radially in a sinusoidal shape between said radially inner end and said radially outer end; and
a second portion coupled to said first portion, said second portion extending radially beyond the end cap diameter, said second portion further extending parallel to the axis of rotation, said second portion comprising a first end and a second end; and
a second heat fin comprising a second inner surface and a second outer surface opposite said second inner surface, said second inner surface and said second outer surface extending parallel to the axis of rotation, said second inner surface coupled to said second end, said second heat fin extending from said second end in the direction of the axis of rotation, wherein said second heat fin comprises a heat shield and extends circumferentially around at least a portion of said end cap.

2. The housing of claim 1, wherein said first portion comprises a first shape and said second portion comprises a second shape that is different than said first shape.

3. The housing of claim 1, wherein said second portion comprises a first end and a second end, said first end has a smaller width than said second end.

4. The housing of claim 1, wherein said first portion comprises a first side and a second side which define a channel there between.

5. The housing of claim 1, wherein a pair of adjacent first heat fins of said plurality of first heat fins define a channel there between.

6. The housing of claim 1, wherein said second heat fin is coupled to each second portion of said plurality of first heat fins.

7. The housing of claim 1, further comprising a third heat fin coupled to said inner surface.

8. The housing of claim 1, further comprising a third heat fin coupled to said inner surface, said third heat fin comprising a plurality of projections.

9. The housing of claim 1, further comprising a third heat fin coupled to said inner surface, said third heat fin comprising a plurality of first projections and a plurality of second projections, said plurality of first projections comprising a plurality of substantially square projections, said plurality of second projections having an elongated rectangular shape different than said plurality of first projections.

10. The housing of claim 1, wherein said plurality of first heat fins defines a channel between adjacent first portions of adjacent first heat fins, wherein said channel includes a plurality of alternating converging and diverging portions extending from said radially inner end to said radially outer end.

11. An electrical machine having an axis of rotation, said electrical machine comprising:
a motor comprising a stator, a rotor coupled to said stator and a motor shaft coupled to said rotor along the axis of rotation;
a housing coupled to and enclosing said motor; and
an end cap having a diameter and comprising:
a shaft bore wall defining a shaft bore surrounding the axis of rotation;
an outer surface and an inner surface;

a plurality of first heat fins coupled to said outer surface, said plurality of first heat fins oriented perpendicular to the axis of rotation in a radial direction, each first heat fin of said plurality of first heat fins comprising:
  a first portion comprising a radially inner end and a radially outer end, wherein said first portion extends radially in a sinusoidal shape between said radially inner end and said radially outer end; and
  a second portion coupled to said first portion, said second portion extending radially beyond the end cap diameter, said second portion further extending parallel to the axis of rotation, said second portion comprising a first end, a second end, and a first radially outer surface; and
a second heat fin comprising a second inner surface and a second outer surface opposite said second inner surface, said second inner surface and said second outer surface extending parallel to the axis of rotation, said second inner surface coupled to said second end, said second heat fin extending from said second end in the direction of the axis of rotation, wherein said second heat fin extends circumferentially around at least a portion of said end cap, and wherein said second outer surface is radially flush with said first radially outer surface of said second portion.

12. The electrical machine of claim 11, wherein said first portion comprises a first shape and said second portion comprises a second shape that is different than said first shape.

13. The electrical machine of claim 11, wherein said second portion comprises a first end and a second end, said first end has a smaller width than said second end.

14. The electrical machine of claim 11, wherein said second portion comprises a first end and a second end and said second heat fin is coupled to said second end.

15. The electrical machine of claim 11, further comprising a third heat fin coupled to said inner surface, said third heat fin comprising a third shape that is different than at least one of said first shape and said second shape.

16. The electrical machine of claim 11, further comprising a third heat fin coupled to said inner surface, said third heat fin comprising a plurality of first projections and a plurality of second projections that include an elongated rectangular shape different than said plurality of first projections, said plurality of first projections comprising a plurality of substantially square projections.

17. The electrical machine of claim 11, wherein said plurality of first heat fins defines a channel between adjacent first portions of adjacent first heat fins, wherein said channel includes a plurality of alternating converging and diverging portions extending from said radially inner end to said radially outer end.

18. A method of assembling an electrical machine, said method comprising:
coupling a plurality of first heat fins of an end cap to an outer surface of the end cap of the electrical machine, the end cap having an end cap diameter and comprising an axis of rotation, the plurality of first heat fins oriented perpendicular to the axis of rotation in a radial direction, each first heat fin of the plurality of first heat fins comprising:
  a first portion comprising a radially inner end and a radially outer end, wherein the first portion extends radially in a sinusoidal shape between the radially inner end and the radially outer end; and
  a second portion coupled to the first portion and having a second shape that is different than the first shape, the second portion extending radially beyond the end cap diameter, the second portion further extending parallel to the axis of rotation, the second portion comprising a first end and a second end; and
coupling a second heat fin of the end cap to the second end, the second heat fin includes a second inner surface opposite a second outer surface, the second inner surface and the second outer surface extending parallel to the axis of rotation, the second inner surface coupled to the second end, the second heat fin including a heat shield and extending from the second end in the direction of the axis of rotation beyond the second end of a plurality of the plurality of first heat fins, wherein the second heat fin extends circumferentially around at least a portion of the end cap.

19. The method of claim 18, further comprising coupling a third heat fin to an inner surface of the end cap.

20. A housing for enclosing electronics of a motor having an axis of rotation, said housing comprising:
an end cap having an end cap diameter and comprising:
  a shaft bore wall defining a shaft bore surrounding the axis of rotation;
  an outer surface and an inner surface; and
  a plurality of sets of heat fins, wherein each set of heat fins comprises:
    a plurality of first heat fins coupled to said outer surface, said plurality of first heat fins oriented perpendicular to the axis of rotation in a radial direction, each first heat fin of said plurality of first heat fins comprising:
      a first portion comprising a first end and a second end, wherein said first portion extends radially in a sinusoidal shape between said first end and said second end; and
      a second portion coupled to said first portion and extending parallel to the axis of rotation and beyond said end cap diameter, said second portion comprising a first end and a second end, said second portion having a divergent shape; and
    a second heat fin comprising a second inner surface and a second outer surface opposite said second inner surface, said second inner surface and said second outer surface extending parallel to the axis of rotation, said second inner surface coupled to said second end, said second heat fin extending from said second end in the direction of the axis of rotation, wherein said second heat fin extends circumferentially around at least a portion of said end cap.

21. The housing of claim 20, wherein said plurality of first heat fins defines a channel between adjacent first portions of adjacent first heat fins, wherein said channel includes a plurality of alternating converging and diverging portions extending from said radially inner end to said radially outer end.

* * * * *